United States Patent
Tokunaga et al.

(10) Patent No.: US 7,988,866 B2
(45) Date of Patent: *Aug. 2, 2011

(54) METHOD OF TREATING FUMED SILICA-CONTAINING DRAINAGE WATER

(75) Inventors: Shinji Tokunaga, Shunan (JP); Yoshiaki Koga, Shunan (JP); Toshihiko Inoue, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 395 days.

This patent is subject to a terminal disclaimer.

(21) Appl. No.: 11/990,739

(22) PCT Filed: Aug. 17, 2006

(86) PCT No.: PCT/JP2006/316541
§ 371 (c)(1),
(2), (4) Date: May 21, 2008

(87) PCT Pub. No.: WO2007/023874
PCT Pub. Date: Mar. 1, 2007

(65) Prior Publication Data
US 2008/0264871 A1    Oct. 30, 2008

(30) Foreign Application Priority Data
Aug. 24, 2005 (JP) ................... 2005-242792

(51) Int. Cl.
*C02F 1/56* (2006.01)
(52) U.S. Cl. ........................ 210/727; 210/716
(58) Field of Classification Search ........... 210/716
See application file for complete search history.

(56) References Cited

U.S. PATENT DOCUMENTS

| 4,923,629 | A | 5/1990 | Hasegawa et al. | |
|---|---|---|---|---|
| 5,965,027 | A * | 10/1999 | Allen et al. | 210/638 |
| 6,203,711 | B1 | 3/2001 | Moffett | |
| 6,258,277 | B1 * | 7/2001 | Salmen et al. | 210/638 |
| 6,468,492 | B2 | 10/2002 | Poncelet | |
| 6,572,771 | B2 * | 6/2003 | Yamasaki et al. | 210/605 |
| 7,338,617 | B2 * | 3/2008 | Koga et al. | 252/179 |
| 7,674,374 | B2 * | 3/2010 | Robles | 210/175 |
| 2003/0019815 | A1 | 1/2003 | Koga et al. | |
| 2005/0115908 | A1 | 6/2005 | Umezawa et al. | |
| 2005/0121377 | A1 | 6/2005 | Koga et al. | |

FOREIGN PATENT DOCUMENTS

| EP | 1 260 484 A2 | 11/2002 |
|---|---|---|
| JP | 3-14516 B2 | 2/1991 |
| JP | 4-75796 B2 | 12/1992 |
| JP | 6-71246 A | 3/1994 |
| JP | 6-134469 A | 5/1994 |
| JP | 10-034161 A | 2/1998 |
| JP | 10-323675 A | 12/1998 |
| JP | 11-33560 A | 2/1999 |
| JP | 2000-140861 A | 5/2000 |
| JP | 2001-276599 A | 10/2001 |
| JP | 20020-18206 A | 1/2002 |
| JP | 2002-326003 A | 11/2002 |
| JP | 2003-38908 A | 2/2003 |
| JP | 2003-221222 A | 8/2003 |
| JP | 2003-285074 A | 10/2003 |
| JP | 2004-261708 A | 9/2004 |
| JP | 2005-152880 A | 6/2005 |
| JP | 2003-500192 A | 1/2007 |

OTHER PUBLICATIONS

Office Action dated Mar. 29, 2010 issued in corresponding Canadian Application No. 2,620,066.
Office Action dated Aug. 17, 2010 issued in corresponding U.S. Appl. No. 11/990,758.
Office Action dated Jan. 5, 2011 issued in corresponding U.S. Appl. No. 11/990,758.
Office Action dated Mar. 30, 2010 issued in Canadian Application No. 2,620,058 corresponding to Application No. 11/990,758.

* cited by examiner

*Primary Examiner* — Peter A Hruskoci
(74) *Attorney, Agent, or Firm* — Birch, Stewart, Kolasch & Birch, LLP

(57) ABSTRACT

In a process for treatment of powdery fumed silica, fumed silica to be discarded is collected by dispersing the fumed silica in water. Disclosed is a method for treatment of a fumed silica-containing wastewater collected in the process. The method comprises the steps of: adding an inorganic coagulant containing a metal to a fumed silica-containing wastewater in an amount of 15 to 300 mg/l. in terms of the metal, wherein the wastewater is either a wastewater containing fumed silica at a concentration of 0.05 to 3.0% by mass or a wastewater whose fumed silica content is adjusted to 0.05 to 3.0% by mass; and adding an organic polymeric coagulant to the mixture.

3 Claims, No Drawings

METHOD OF TREATING FUMED SILICA-CONTAINING DRAINAGE WATER

This application is the U.S. national stage under 35 U.S.C. §371 of international application PCT/JP2006/316541, filed Aug. 17, 2006. Priority is claimed under 35 U.S.C. §119 to Japanese application number 2005-242792, filed Aug. 24, 2005.

TECHNICAL FIELD

The present invention relates to a method of treating drainage water containing fumed silica. More specifically, it relates to a method of treating drainage water containing fumed silica whose concentration has been adjusted to a predetermined level.

BACKGROUND ART

It is known that fumed silica is manufactured by flame hydrolysis, more specifically, by burning silicon chloride as a raw material in flame, and fumed silica is used in various fields such as reinforcers, abrasives, external additives, fillers and thickeners.

The fumed silica manufactured as described above is an agglomerate of silica having a primary particle diameter of 5 to 50 nm and very small in particle size and therefore difficult to handle. Particularly fumed silica which will become waste is difficult to handle because it is a fine particle and must be collected and disposed of not to contaminate work environment.

An example of fumed silica which is discharged as waste from the step of handling powdery fumed silica is fumed silica which remains in pipes, apparatuses and bags when it is packed or taken out from a bag. Since fumed silica is obtained from silicon chloride, hydrogen chloride is by-produced at the time of manufacturing fumed silica. Fumed silica which is not collected as a product is discharged together with hydrogen chloride.

Since particulate waste such as fumed silica may scatter during work to contaminate work environment as described above or contaminate the environment of its handling site, various studies on the handling and disposal of fumed silica are under way. For example, as means of disposing of fine powders, there are proposed methods of coagulating fine particles as a mass.

Stated more specifically, there are proposed a method in which fine particles to be swollen by hot water are kept in a vessel together with water and a high-temperature gas is injected to bind them together and coagulate them as a mass (see JP-A 6-71246), a method in which water, a fixation agent and a set accelerating agent are added to and mixed with fine powders (see JP-A 2001-276599), and a method in which a pH control agent or an oxidation agent is added to colloidal silica-containing drainage water and an inorganic flocculant is added to treat the drainage water (see JP-A 2004-261708).

However, since fine particles are coagulated to be treated in the first two methods, when the fine particles are coagulated, a coagulated product may adhere to a vessel or apparatus. Therefore, there is room for the improvement from a view point of operation efficiency. JP-A 2004-261708 is silent about the treatment of fumed silica-containing drainage water.

Further, JP-B 4-75796 discloses a flocculant for treating water, which is composed of a silica sol-metal salt. However, in the method disclosed by JP-B 4-75796, the treatment of only water having a given turbidity is carried out, and the method of treating fumed silica-containing drainage water which is the target of the present invention is not disclosed.

DISCLOSURE OF THE INVENTION

It is therefore an object of the present invention to provide a method of treating fumed silica which has high operation efficiency and easily.

It is another object of the present invention to provide a method of treating fumed silica-containing drainage water, in which a coagulation treatment can be carried out stably and the turbidity of water from which an agglomerate has been separated can be fully reduced when fumed silica-containing drainage water is treated.

The inventors of the present invention have continued intensive studies to solve the above problem. As a result, they have found that the above object can be attained by dispersing fumed silica which will become waste into water to collect it, including an inorganic flocculant into the collected fumed silica-containing drainage water directly or after the concentration of the collected fumed silica-containing drainage water is adjusted to a predetermined level, and adding an organic polymer flocculant. The present invention has been accomplished based on this finding.

That is, the present invention is a method of treating drainage water containing fumed silica collected by dispersing fumed silica which will become waste into water from the step of handling powdery fumed silica, comprising the steps of:

including of an inorganic flocculent containing a metal into fumed silica-containing drainage water having a fumed silica concentration of 0.05 to 3.0 mass % or fumed silica-containing drainage water whose fumed silica concentration has been adjusted to 0.05 to 3.0 masse to ensure that the concentration of the metal becomes 15 to 300 mg/L; and adding an organic polymer flocculant.

BEST MODE FOR CARRYING OUT THE INVENTION

The present invention will be described in detail hereinunder.

In the present invention, an example of fumed silica which is discharged as waste from the step of handling powdery fumed silica is fumed silica which remains in pipes, apparatuses and bags when it is packed or taken out from a bag. This is produced at a factory for manufacturing fumed silica or a factory in which powdery fumed silica is handled. Since fumed silica is obtained from silicon chloride, hydrogen chloride is by-produced at the time of manufacturing fumed silica. Since fumed silica which is not collected as a product is discharged together with this hydrogen chloride, this fumed silica is included in objects to be treated in the present invention.

In the present invention, fumed silica which will become waste and is discharged from the above step is dispersed into water to be collected. When fumed silica discharged at the time of packing or the like is dispersed into water and treated, the scattering of fumed silica can be prevented and the contamination of work environment can be suppressed. Fumed silica which is not collected as a product together with hydrogen chloride at the time of manufacturing fumed silica can be collected by removing dust from fumed silica which will become waste by means of water in advance when hydrogen chloride is collected as hydrochloric acid. Fumed silica which will become waste can be dispersed into water and collected from a hydrogen chloride gas containing the fumed silica efficiently by removing dust from the fumed silica by using water. In this case, water used to remove dust may be an aqueous solution of hydrochloric acid containing hydrogen chloride.

In the present invention, the fumed silica-containing drainage water collected by dispersing fumed silica into water can be used as it is when the concentration of fumed silica is 0.05 to 3.0 mass %. However, when the concentration of fumed silica is outside this range, it is important that the concentration of fumed silica should be adjusted to this range. In general, it is advantageous for the coagulation treatment of drainage water when the total amount of drainage water is small because the amount of a product to be disposed of is small. That is, when the amount of drainage water is fixed, as the amount of suspended matter (amount of fumed silica in the present invention) contained in the drainage water increases, the amount of water to be disposed of decreases, which is extremely advantageous at the time of solid-liquid separation in the subsequent step.

However, according to studies conducted by the inventors of the present invention, it has been found that when drainage water containing fumed silica is treated and the concentration of fumed silica is higher than 3.0 mass %, an coagulation treatment cannot be carried out stably. When the concentration of fumed silica is higher than 3.0 mass %, an agglomerate becomes bulky and sedimentation property is lost, thereby making it impossible to carry out concentration and separation to the full. In addition, when the concentration is higher than 3.0 mass %, viscosity may rise due to the action of the silanol groups of fumed silica each other, whereby an coagulation treatment cannot be carried out stably. When the concentration of fumed silica is lower than 0.05 mass %, the amount of drainage water becomes large as compared with the amount of fumed silica, thereby making an coagulation treatment inefficient. By controlling the concentration of fumed silica to 0.05 to 3.0 mass %, fumed silica-containing drainage water can be treated economically efficiently and stably. When a stable coagulation treatment and efficiency are taken into consideration, the concentration of fumed silica contained in the fumed silica-containing drainage water is more preferably 0.1 to 1 mass %.

In the present invention, the method of controlling the concentration of the above fumed silica-containing drainage water is not particularly limited. The amount of drainage water and the amount of silica are adjusted to ensure that the concentration of fumed silica contained in the drainage water becomes 0.05 to 3.0 masse. For instance, fumed silica which remains in the pipes, apparatuses, etc. at the time of packing is collected and the concentration of fumed silica is adjusted to be within the above range by using a sufficient amount of water. When the above remaining fumed silica is collected by using a small amount of water, water is added to ensure that the concentration of fumed silica in the collected fumed silica-containing drainage water satisfies the above range.

When fumed silica is collected by removing dust from fumed silica contained in the hydrogen chloride gas at the time of manufacturing fumed silica, the amount of water is determined based on the amount of fumed silica to be discharged so that the concentration of the obtained fumed silica-containing drainage water to be adjusted to satisfy the above range. Also in this case, when fumed silica is collected with a small amount of water, water can be added to ensure that the amount of fumed silica satisfies the above range.

Further, when the treating method of the present invention is adopted at a factory for manufacturing fumed silica, the concentration of fumed silica in the obtained drainage water can be adjusted to 0.05 to 3.0 mass % by mixing together fumed silica-containing drainage water produced at the time of packing and fumed silica-containing drainage water collected from the hydrogen chloride gas.

In the present invention, when fumed silica which will become waste is collected with a small amount of water to adjust the concentration of the above fumed silica-containing drainage water, the concentration of fumed silica can be adjusted to 0.05 to 3.0 masse by adding another drainage water. As the above another drainage water, any drainage water is acceptable if it does not change the properties such as viscosity of the fumed silica-containing drainage water by interaction, or drainage water containing inorganic suspended matter other than fumed silica. Out of these, drainage water containing a silicon powder, for example, metal silicon or silicon chips as suspended matter (may be referred to as "silicon powder-containing drainage water" hereinafter) may be effectively used to adjust the concentration of fumed silica because interaction does not occur when it is mixed with the fumed silica-containing drainage water. In addition, this silicon powder-containing drainage water is often produced at the same place as a place where the fumed silica-containing drainage water is produced. By treating both of them at the same time, the treatment of drainage water can be efficiently carried out. That is, since silicon chlorides as the raw material of fumed silica are obtained by using metal silicon in a reaction, drainage water containing this metal silicon is discharged. Silicon chlorides are used for the manufacture of silicon and drainage water containing silicon chips is discharged when silicon is cut. In a factory where this manufacture is carried out, the above drainage water may be added to the fumed silica-containing drainage water for use. Since suspended fumed silica and suspended silica powder can be agglomerated and precipitated in the coagulation treatment method which will be detailed hereinafter, waste can be treated efficiently. Further, though the reason is not found, the pH range of drainage water obtained by mixing the fumed silica-containing drainage water with the silicon-containing drainage water can be expanded when an inorganic flocculant containing a metal or an organic polymer flocculant is used, which is effective in operation.

Even when the silicon powder-containing drainage water is added to the fumed silica-containing drainage water in the present invention, the concentration of fumed silica is adjusted to 0.05 to 3.0 mass % based on the total amount of drainage water. As described above, even when the silicon powder-containing drainage water is added to the fumed silica-containing drainage water, the both do not interact with each other and do not affect the properties of the fumed silica-containing drainage water. Therefore, as for the ratio of fumed silica to silicon powder contained in the mixture, when the amount of silicon powder is 50 to 150 parts by mass based on 100 parts by mass of fumed silica, both of them can be removed as agglomerated precipitates by an coagulation treatment which will be detailed hereinafter.

In the present invention, the pH of the fumed silica-containing drainage water can be determined by pre-testing to become the optimum pH at which an coagulation treatment is carried out efficiently when a large amount of drainage water is treated. When the silicon powder-containing drainage water is added to the fumed silica-containing drainage water, pH is preferably set to less than 10.

In the present invention, the properties of fumed silica contained in the above fumed silica-containing drainage water do not differ from those of an ordinary product and are not particularly limited. However, in the treating method of the present invention, fumed silica having an average primary particle diameter of 1 to 50 nm and a specific surface area of 40 to 400 m²/g can be agglomerated. Particularly when an inorganic flocculant composed of a silica sol-iron salt or a silica sol-aluminum salt is used, even fumed silica having a specific surface area of 140 m²/g or less can be easily agglomerated and the turbidity of the supernatant can be reduced to 10 degrees or less.

In the present invention, an inorganic flocculant containing a metal is included into the above fumed silica-containing drainage water having a fumed silica concentration of 0-05 to 3.0 mass % to ensure that the metal concentration becomes 15 to 300 (mg/L). In order to include the inorganic flocculant, the inorganic flocculant may be added continuously or in multiple stages to the fumed silica-containing drainage water to ensure that the metal concentration satisfies the above range. Although the temperature for including the inorganic flocculant for an coagulation treatment is not particularly limited in the present invention, when operation efficiency is taken into is consideration, the temperature is preferably 5 to 40° C., more preferably 10 to 30° C.

In the present invention, the inorganic flocculant containing a metal may be an inorganic flocculant containing an elemental metal, for example, a metal salt such as aluminum salt or iron salt, or a combination of the metal salt and silica sol. Specific examples of the inorganic flocculent include aluminum sulfate, ferric chloride, ferrous sulfate, iron polysulfate and silica sol-iron salts and silica sol-aluminum salts. Out of these, an inorganic flocculant composed of a silica sol-iron salt or a silica sol-aluminum salt having a molar ratio of silicon to iron or aluminum of 0.05 to 3 is particularly preferred to achieve a high sedimentation rate of an agglomerate after the organic polymer flocculant is added and to remove suspended matter which provides a turbidity of 10 degrees or less to the supernatant. The inorganic flocculants composed of a silica sol-iron salt and a silica sol-aluminum salt may be referred to as "silica sol-based inorganic flocculants" hereinafter.

In the present invention, the inorganic flocculant composed of a silica sol-iron salt is a composite containing silica sol and iron which is a polymer and can be obtained by mixing ferric chloride, ferrous sulfate or iron polysulfate with silica sol. The inorganic flocculant composed of a silica sol-aluminum salt is a composite containing silica sol and aluminum which is a polymer and can be obtained by mixing aluminum sulfate with silica sol. When an inorganic flocculant composed of a silica sol-aluminum salt is used out of these silica sol-based inorganic flocculants, the supernatant can be recycled because it is not stained.

In the present invention, the molar ratio of silicon to iron or aluminum (to be referred to as "Si/Fe molar ratio or Si/Al molar ratio" hereinafter) in the above silica sol-based inorganic flocculant is preferably 0.05 to 3.0. When the Si/Fe or Si/Al molar ratio is 0.05 to 3.0, the turbidity of the supernatant can be further reduced, and the sedimentation rate of the agglomerate can be increased to enhance the separation efficiency. When the Si/Fe or Si/Al molar ratio is lower than 0.05, the turbidity of the supernatant tends to become high and when the Si/Fe or Si/Al molar ratio is higher than 3.0, the sedimentation rate of the agglomerate tends to become low. When the turbidity of the supernatant and the sedimentation rate of the agglomerate are taken into consideration, the Si/Fe or Si/Al molar ratio is preferably 0.05 to 2.0, more preferably 0.05 to 1.5.

Since the fumed silica-containing drainage water has a fumed silica concentration of 0.05 to 3.0 mass % as described above in the present invention, it is expected that the amount of the drainage water becomes large. However, when the above silica sol-based inorganic flocculant is used, the sedimentation rate of the agglomerate becomes high and the turbidity of the supernatant can be adjusted to 10 degrees or less or optimized to 3 degrees or less. Therefore, the treated water can be recycled to the manufacturing process according to the composition of dissolved matter contained in the above supernatant or re-used as concentration-adjusted water for treating the drainage water.

The method of manufacturing the silica sol-based inorganic flocculant will be described in detail hereinunder.

In the present invention, an inorganic flocculant composed of a silica sol-iron salt having an Si/Fe molar ratio of 0.05 to 3.0 can be manufactured, for example, by producing silica sol through a reaction between an aqueous solution of sodium silicate and mineral acid containing no halogen and mixing the silica sol with ferric chloride to ensure that the Si/Fe molar ratio becomes 0.05 to 3.0. An inorganic flocculant composed of a silica sol-aluminum salt having an Si/Al molar ratio of 0.05 to 3.0 is prepared by producing silica sol through a reaction between an aqueous solution of sodium silicate and mineral acid containing no halogen and mixing the silica sol with aluminum sulfate to ensure that the Si/Al molar ratio becomes 0.05 to 3.0.

To enable the obtained silica sol-based inorganic flocculant to show an excellent effect in the present invention, it is preferred that the silica sol should be produced by the method disclosed by JP-A 2003-221222 and mixed with ferric chloride or aluminum sulfate.

That is, it is preferred that a mixture obtained by bringing an aqueous solution of sodium silicate into collision with mineral acid containing no halogen such as sulfuric acid in a Y or T type reactor should be aged and diluted to produce the silica sol which is then mixed with ferric chloride or aluminum sulfate. The above term "aging" means that the polymerization of the silica sol is promoted in the mixture containing the silica sol.

In the present invention, a silica sol-based inorganic flocculant having a pH of 1.5 to 2.5 and an $SiO_2$ concentration of 5 to 25 g/L is preferred as the above silica sol-based inorganic flocculant because pH and the $SiO_2$ concentration are well balanced. The viscosity of the above silica sol-based inorganic flocculant is preferably 1 to 5 mPa·s.

The silica sol-based inorganic flocculant which satisfies the above range can be manufactured by producing silica sol having a viscosity of 3 to 6 mPa·s using a Y or T type reactor and mixing it with ferric chloride or aluminum sulfate. By using silica sol having the above viscosity, a silica sol-based inorganic flocculant having a high degree of polymerization and an expanded bead-like structure can be prepared efficiently in a short period of time.

In the present invention, the above silica sol-based inorganic flocculant is comprised of nanoparticles. Since it is comprised of nanoparticles, it can increase the function of agglomerating fine fumed silica or fine particles containing silicon powders according to drainage water. Further, since the above silica sol-based inorganic flocculant has the effect of adsorbing fumed silica or fine particles including silicon powders according to drainage water by $Fe^{3+}$ or $Al^{3+}$ and the effect of agglomerating and precipitating fine particles by silica sol at the same time, it can exhibit more excellent effects than a system in which silica sol and ferric chloride or silica sol and aluminum sulfate are added separately.

A description is subsequently given of the amount of the inorganic flocculant to be included in the fumed silica-containing drainage water.

In the present invention, it is important that the inorganic flocculant to be included into the above fumed silica-containing drainage water should be included in an amount of preferably 15 to 300 mg/L, more preferably 20 to 250 mg/L in terms of a metal. Stated more specifically, when the inorganic flocculent containing a metal is aluminum sulfate, aluminum sulfate is mixed with the fumed silica-containing drainage water to ensure that the amount of aluminum becomes 15 to 300 mg/L. When a silica sol-based inorganic flocculent is used, it is mixed with the fumed silica-containing drainage water to ensure that the amount of iron or aluminum contained in the flocculant becomes 15 to 300 mg/L. When the amount of the inorganic flocculant to be included into the fumed silica-containing drainage water is smaller than 15 mg/L in terms of a metal, the turbidity of the above supernatant cannot be reduced fully disadvantageously. When the amount is larger than 300 mg/L, an excessive amount of the inorganic flocculant is used uneconomically and the bulk volume of the agglomerate increases, thereby making sedimentation concentration difficult. When the effect of reducing the turbidity of the supernatant, sedimentation concentration efficiency and economy are taken into consideration, the amount of the inorganic flocculant containing a metal is preferably 20 to 250 mg/L in terms of a metal.

In the present invention, the pH of the fumed silica-containing drainage water containing the above inorganic flocculant (may be referred to as "drainage water to be treated" hereinafter) is not particularly limited but controlled to preferably 5 to 10, more preferably 5.5 to 9. When silicon powders are contained in the fumed silica-containing drainage water, even if pH is outside the above range, the drainage water to be treated can be treated. By controlling the pH of the drainage water to be treated to 5 to 10, the effect of an organic polymer flocculant which will be detailed hereinafter can be enhanced. Further, when pH is adjusted to a level based on discharge standards within the above range, the finally obtained treated water can be discharged without controlling its pH. By controlling the pH of the drainage water to be treated to the above range, when the silica sol-based inorganic flocculant is used, its agglomerating effect is improved advantageously.

In the present invention, to control the pH of the above drainage water to be treated to 5 to 10, a method in which pH is controlled by adding an inorganic flocculant containing a metal to the fumed silica-containing drainage water or a method in which pH is controlled by adding an acid or alkali to the drainage water after the inorganic flocculant is added may be employed. That is, when the pH of the drainage water to be treated to which an inorganic flocculant containing a metal has been added is 5 to 10, an organic polymer flocculant may be added to the drainage water directly. When the pH of the drainage water to be treated to which an inorganic flocculant containing a metal has been added is outside the range of 5 to 10, pH can be controlled to 5 to 10 by adding an acid or alkali. When pH is to be controlled by adding only an inorganic flocculant containing a metal to the fumed silica-containing drainage water, the pH of the fumed silica-containing drainage water may be controlled in advance so that the pH of the drainage water to be treated satisfies the above range.

A description is subsequently given of the organic polymer flocculant which is added to the above drainage water to be treated.

In the present invention, the organic polymer flocculant is then added to the above drainage water to be treated. By further adding the organic polymer flocculant, the coagulation treatment efficiency can be improved. The temperature for adding the organic polymer flocculent is not particularly limited but preferably 5 to 40° C., more preferably 10 to 30° C. when operation efficiency is taken into consideration.

The organic polymer flocculant in the present invention is not particularly limited and a known flocculant may be used. Examples of the organic polymer flocculant include cationic polymer flocculants such as polyacrylamide cationized modified products, dimethyl aminoethyl polyacrylates, dimethyl aminoethyl polymethacrylates, polyethyleneimine and chitosan, nonionic polymer flocculants such as polyacrylamide, and polyacrylic acid-based and polyacrylamide-based anionic polymer flocculants such as a copolymer of acrylamide and acrylic acid and/or salts thereof, and polyacrylamide into which a sulfone group is introduced. Out of these, polyacrylamide-based anionic polymer flocculants and nonionic polymer-flocculants such as polyacrylamide are preferably used.

The amount of the organic polymer flocculant to be added which is suitably adjusted according to the types and properties of the fumed silica-containing drainage water and the organic polymer flocculant is preferably 0.1 to 10 mg/L, more preferably 0.5 to 5 mg/L based on the amount of the drainage water to be treated. When the amount of the organic polymer flocculent satisfies the above range, the agglomerating effect can be enhanced and the drainage water can be treated efficiently without increasing separation resistance at the time of separating an agglomerated precipitate.

In the present invention, known means of separating an agglomerate (precipitate) after the organic polymer flocculant is added may be employed. Specific examples of the means include decantation, filter press, centrifugation, belt filter, polydisk dehydrator and screw press.

In the present invention, in order to treat a large amount of the fumed silica-containing drainage water, it is preferred that a treatment should be carried out after the optimal treating conditions, that is, the optimal pH of the fumed silica-containing drainage water, the optimal pH of the drainage water to be treated, the amount of the inorganic flocculant and the amount of the organic polymer flocculant are found by using a small amount of the fumed silica-containing drainage water because the amount and composition of suspended matter contained in the fumed silica-containing drainage water differ according to drainage water.

In the present invention, the turbidity of the supernatant of the treated water after the organic polymer flocculant is added can be set to 15 degrees or less by the measurement method which will be described hereinafter. Therefore, the treated water separated from the above agglomerate has a low turbidity and can be discharged as drainage water without carrying out a secondary treatment. Further, when a silica sol-based inorganic flocculant is used as the inorganic flocculant, the turbidity of the treated water can be reduced to preferably 10 degrees or less, more preferably 5 degrees or less, much more preferably 3 degrees or less. Therefore, when the silica sol-based inorganic flocculant is used, the treated water can be recycled to the manufacturing process according to the composition of dissolved matter contained in the treated water.

In the present invention, as the obtained agglomerate contains silica, aluminum, iron and silicon according to drainage water, it can be recycled as a raw material for cement or a valuable resource for brick.

According to the present invention, as fumed silica which will become waste is dispersed into water to be collected, the contamination of work environment can be suppressed. By controlling the concentration of the obtained fumed silica-containing drainage water, the coagulation treatment of the drainage water can be carried out stably. When the concentration of the fumed silica-containing drainage water is controlled by using drainage water containing metal silicon (may be referred to as "silicon powder-containing drainage water" hereinafter) which is discharged at the time of manufacturing silicon chloride as a raw material for fumed silica, both fumed silica and metal silicon can be agglomerated at the time of an coagulation treatment, which is efficient and more effective as the efficiency of the subsequent solid-liquid separation step rises.

According to the method of treating fumed silica-containing drainage water of the present invention, as water from which an agglomerate has been separated has a low turbidity, it can be discharged without carrying out a secondary treatment. Particularly when a silica sol-iron salt or a silica sol-aluminum salt is used as the inorganic flocculant, the turbidity of the supernatant can be reduced to 10 degrees or less, whereby the treated water can be not only discharged but also recycled to the manufacturing process according to dissolved matter contained in the treated water. Further, it can be used to control the concentration of fumed silica.

The agglomerate separated by the method of the presents invention contains iron or aluminum and silica and can be re-used as a valuable resource such as a raw material for cement and brick.

EXAMPLES

The following examples are provided for the purpose of further illustrating the present invention but are in no way to be taken as limiting.

Measurement values in Examples and Comparative Examples were obtained by the following methods.

1) Turbidity (Degree: Kaolin as a Standard Substance)

The turbidity of the supernatant after an coagulation treatment was measured by a spectrophotometer (wavelength: 660 nm, cell length: 10 mm) in accordance with JIS K0101.

2) Measurement of pH

This was measured by TOA-HM35V (of To a DKK Kogyo Co., Ltd.).

Manufacturing Examples 1 to 4 of Silica Sol-Based Inorganic Flocculant

Diluted sodium silicate ($SiO_2$: 282.8 g/L, $Na_2O$: 94.1 g/L, MR: 3.10) and diluted sulfuric acid ($H_2SO_4$: 199.9 g/L) prepared by diluting commercially available sodium silicate and sulfuric acid with water were reacted with each other for 10 minutes in a Y type collision reactor measuring 40 mm×40 mm at a sodium silicate feed rate of 6.59 L/min and a flow rate of 15.5 m/sec (nozzle diameter: 3.0 mm) and a diluted sulfuric acid feed rate of 5.65 L/min and a flow rate of 15.3 m/sec (nozzle diameter: 2.8 mm) by setting the flow rate at the time of discharge to 2.6 m/sec to obtain 122.4 L of silica sol ($SiO_2$: 151.8 g/L). This silica sol was aged until its viscosity became 10 mPa·s without stirring it and diluted with 622.8 L of water to manufacture diluted silica sol having an $SiO_2$ concentration of 25 g/L. This diluted silica sol had a pH of 1.92 and a viscosity of 3.8 mPa·s.

This diluted silica sol and aluminum sulfate were mixed together in a certain ratio and used as an inorganic flocculant composed of a silica sol-aluminum salt for fumed silica-containing drainage water.

The mixing ratio of the inorganic flocculent composed of a silica sol-aluminum salt is shown in Table 1. The Al concentration of aluminum sulfate used was 56.66 g/L.

TABLE 1

| | Amount of diluted silica sol (ml) | amount of aluminum sulfate (ml) | silica sol-aluminum salt inorganic flocculant | | |
|---|---|---|---|---|---|
| | | | Si/Al (molar ratio) | $SiO_2$ concentration (g/L) | pH | Al concentration (g/L) |
| Manufacturing Example 1 | 100 | 400 | 0.05 | 5.0 | 2.1 | 45.2 |
| Manufacturing Example 2 | 100 | 80 | 0.25 | 13.9 | 2.1 | 25.1 |
| Manufacturing Example 3 | 100 | 20 | 1.0 | 20.8 | 2.2 | 9.4 |
| Manufacturing Example 4 | 100 | 6.6 | 3.0 | 23.5 | 2.2 | 3.5 |

Manufacturing Examples 5 to 7 of Silica Sol-Based Inorganic Flocculant

Diluted sodium silicate ($SiO_2$: 280.0 g/L, $Na_2O$: 96.0 g/L, MR: 3.01) and diluted sulfuric acid ($H_2SO_4$: 200.1 g/L) prepared by diluting commercially available sodium silicate and sulfuric acid with water were reacted with each other for 10 minutes in a Y type collision reactor measuring 40 mm×40 mm at a sodium silicate feed rate of 6.59 L/min and a flow rate of 15.5 m/sec (nozzle diameter: 3.0 mm) and a diluted sulfuric acid feed rate of 5.68 L/min and a flow rate of 15.4 m/sec (nozzle diameter: 2.8 mm) by setting the flow rate at the time of discharge to 2.6 m/sec to obtain 122.7 L of silica sol ($SiO_2$; 150.3 g/L). This silica sol was aged until its viscosity became 10 mPa·s without stirring it and diluted with 800 L of water to manufacture diluted silica sol having an $SiO_2$ concentration of 20 g/L. This diluted silica sol had a pH of 1.90 and a viscosity of 3.0 mPa·s.

This diluted silica sol and ferric chloride were mixed together in a certain ratio and used as an inorganic flocculant composed of a silica sol-iron salt for fumed silica-containing drainage water.

The mixing ratio of the inorganic flocculant composed of a silica sol-iron salt is shown in Table 2. The Fe concentration of ferric chloride used was 191.8 g/L.

TABLE 2

|  | amount of diluted silica sol (ml) | amount of ferric chloride (ml) | silica sol-iron salt inorganic flocculant | | | |
| --- | --- | --- | --- | --- | --- | --- |
|  |  |  | Si/Fe (molar ratio) | SiO$_2$ concentration (g/L) | pH | Fe concentration (g/L) |
| Manufacturing Example 5 | 100 | 39.0 | 0.25 | 14.4 | 2.0 | 53.8 |
| Manufacturing Example 6 | 100 | 9.7 | 1.0 | 18.2 | 2.1 | 17.0 |
| Manufacturing Example 7 | 100 | 3.3 | 3.0 | 19.4 | 2.1 | 6.1 |

Example 1

Fumed silica-containing drainage water having a fumed silica concentration of 0.58 mass % was prepared by mixing together drainage water produced at the time of packing and drainage water which was discharged to prevent the concentration of silica when hydrogen chloride was absorbed to be collected (drainage water for collecting fumed silica by dust removal). This drainage water contained fumed silica having an average primary particle diameter of 22 nm and a specific surface area of 90 m$^2$/g and had a pH of 6.7. The turbidity of the fumed silica-containing drainage water before an coagulation treatment was 100 or more 500 ml of this fumed silica-containing drainage water was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added to the drainage water under agitation at 150 rpm. Since pH dropped to 4.2 after addition, it was increased to 6.7 with 1N-NaOH, and the mixture was stirred for 5 minutes. Then, 0.5 ml of the Cliflock PA331 polyacrylamide-based anionic polymer flocculant having a concentration of 0.2 mass % (trade name: manufactured by Kurita Water Industries, Ltd.) was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 27.8% and the turbidity of the supernatant was 1.8. The results are shown in Table 3.

The volume change rate is defined by the following equation. As the volume change rate becomes smaller, sedimentation efficiency becomes higher.

Volume change rate after 5 minutes of standing (%)=height of interface of precipitate from the bottom after 5 minutes of standing÷height of liquid surface×100

Example 2

500 ml of the same drainage water as in Example 1 whose fumed silica concentration had been adjusted to 0.25 mass % (turbidity of 100 or more) was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added under agitation at 150 rpm. Since pH dropped to 4.2 after addition, it was increased to 6.8 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. As for the volume change rate at this point, the sedimentation rate was fast and sedimentation ended after 5 minutes. The turbidity of the supernatant was 1.5. The results are shown in Table 3.

Example 3

The concentration of the same drainage water as in Example 1 was adjusted with silicon powder-containing drainage water containing metal silicon. The concentration of fumed silica after adjustment was 0.25 mass % and the concentration of metal silicon was 0.29 mass %. The turbidity of the fumed silica-containing drainage water before an coagulation treatment was 100 or more. 500 ml of this drainage water was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added under agitation at 150 rpm. Since pH dropped to 4.2 after addition, it was increased to 7.1 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 48.4% and the turbidity of the supernatant was 1.7. The results are shown in Table 3.

Examples 4 and 5

500 ml of the same drainage water as in Example 3 was put into a 500 ml beaker, and a solution of the silica sol-aluminum salt inorganic flocculant having an Si/Al molar is ratio of 0.25 (Al: 2.51 g/100 ml) shown in Manufacturing Example 2 was added under agitation at 150 rpm as shown in Table 3. Since pH dropped after addition, it was increased to a neutral range with 1N-NaOH, and the mixture was stirred for 5 minutes. Then, 0.5 ml of Cliflock PA331 having a concentration of 0.2 masse was added, stirred at 40 rpm for 5 minutes and left to stand for 10 minutes. The volume change rate of a precipitate after 5 minutes of standing and the turbidity of the supernatant sampled after 10 minutes of standing were measured. The results are shown in Table 3.

Example 6

500 ml of the same drainage water as in Example 3 was put into a 500 ml beaker, and 0.22 ml of a solution of the silica sol-aluminum salt inorganic flocculant having an Si/Al molar ratio of 0.05 (Al: 4.52 g/100 ml) shown in Manufacturing Example 1 was added under agitation at 150 rpm. Since pH dropped to 4.4 after addition, it was increased to 7.3 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 44.8% and the turbidity of the supernatant was 2.7. The results are shown in Table 3.

Example 7

500 ml of the same drainage water as in Example 3 was put into a 500 ml beaker, and 1.06 ml of a solution of the silica sol-aluminum salt inorganic flocculent having an Si/Al molar ratio of 1 (Al: 0.94 g/100 ml) shown in Manufacturing Example 3 was added under agitation at 150 rpm. Since pH dropped to 4.5 after addition, it was increased to 7.1 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 40.2% and the turbidity of the supernatant was 2.2. The results are shown in Table 3.

Example 8

500 ml of the same drainage water as in Example 3 was put into a 500 ml beaker, and 2.86 ml of a solution of the silica sol-aluminum salt inorganic flocculent having an Si/Al molar ratio of 3 (Al: 0.35 g/100 ml) shown in Manufacturing Example 4 was added under agitation at 150 rpm. Since pH dropped to 4.0 after addition, it was increased to 7.2 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 56.0% and the turbidity of the supernatant was 1.8. The results are shown in Table 3.

Example 9

500 ml of the same drainage water as in Example 3 was put into a 500 ml beaker, and 0.6 ml (20 mg-Fe/L) of a solution of the silica sol-iron salt inorganic flocculent having an Si/Fe molar ratio of 1 (Fe: 1.7 g/100 ml) shown in Manufacturing Example 6 was added under agitation at 150 rpm. Since pH dropped to 3.8 after addition, it was increased to 7.4 with 1N-NaOH, and the mixture was stirred for 5 minutes. Then, 0.5 ml of the Cliflock PA331 polyacrylamide-based anionic polymer flocculant having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 31.3% and the turbidity of the supernatant was 0.9. The results are shown in Table 3.

Example 10

500 ml of the same drainage water as in Example 3 was put into a 500 ml beaker, and 0.2 ml (20 mg-Fe/L) of a solution of the silica sol-iron salt inorganic flocculent having an Si/Fe molar ratio of 0.25 (Fe: 5.38 g/100 ml) shown in Manufacturing Example 5 was added under agitation at 150 rpm. Since pH dropped to 3.7 after addition, it was increased to 7.2 with 1N-NaOH, and the mixture was stirred for 5 minutes. Then, 0.5 ml of the Cliflock PA331 polyacrylamide-based anionic polymer flocculant having a concentration of 0.2 masse was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 32.2% and the turbidity of the supernatant was 1.1. The results are shown in Table 3.

Example 11

500 ml of the same drainage water as in Example 3 was put into a 500 ml beaker, and 1.6 ml (20 mg-Fe/L) of a solution of the silica sol-iron salt inorganic flocculent having an Si/Fe molar ratio of 3 (Fe: 0.61 g/100 ml) shown in Manufacturing Example 7 was added under agitation at 150 rpm. Since pH dropped to 3.6 after addition, it was increased to 7.8 with 1N-NaOH, and the mixture was stirred for 5 minutes. Then, 0.5 ml of the Cliflock PA331 polyacrylamide-based anionic polymer flocculant having a concentration of 0.2 wt % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 33.5% and the turbidity of the supernatant was 1.9. The results are shown in Table 3.

Example 12

500 ml of the same drainage water as in Example 3 was put into a 500 ml beaker, and 0.18 ml (20 mg-Al/L) of aluminum sulfate having an Al concentration of 5.65 g/100 ml was added under agitation at 150 rpm. Since pH dropped to 4.4 after addition, it was increased to 7.4 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 68.8% and the turbidity of the supernatant was 11.2. The results are shown in Table 3.

Example 13

500 ml of the same drainage water as in Example 3 was put into a 500 ml beaker, and 0.4 ml (20 mg-Al/L) of a solution of the silica sol-aluminum salt inorganic flocculent having an Si/Al molar ratio of 0.25 (Al: 2.51 g/100-ml) shown in Manufacturing Example 2 was added under agitation at 150 rpm. Since pH dropped to 4.4 after addition, it was increased to 7.6 with 1N-NaOH, and the mixture was stirred for 5 minutes. Then, 0.5 ml of the Cliflock PN161 polyacrylamide-based nonionic polymer flocculant having a concentration of 0.2 mass % (trade name: manufactured by Kurita Water Industries, Ltd.) was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 48.4%- and the turbidity of the supernatant was 2.9. The results are shown in Table 3.

Example 14

500 ml of the same drainage water as in Example 3 was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added under agitation at 150 rpm. After addition, pH dropped to 4.2. After 5 minutes of agitation, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate was 40.0% and the turbidity of the supernatant was 1.8. The results are shown in Table 3.

Comparative Example 1

Fumed silica-containing drainage water having a fumed silica concentration of 5.0 mass % was prepared by mixing together drainage water produced at the time of packing and drainage water which was discharged to prevent the concentration of silica when hydrogen chloride was absorbed to be collected (drainage water for collecting fumed silica by dust removal). This drainage water contained fumed silica having an average primary particle diameter of 22 nm and a specific surface area of 90 $m^2/g$ and had a pH of 9.2. The turbidity of the fumed silica-containing drainage water before an coagulation treatment was 100 or more. 500 ml of this fumed silica-containing drainage water was put into a 500 ml beaker, and 0.4 ml (20 mg-Al/L) of a solution of the silica sol-aluminum salt inorganic flocculant having an Si/Al molar ratio of 0.25 (Al: 2.51 g/100 ml) shown in Manufacturing Example 2 was added under agitation at 150 rpm. Since pH dropped to 3.5 after addition, it was increased to 6.8 with 1N-NaOH, and the mixture was stirred for 5 minutes. Then, 0.5 ml of Cliflock PA331 having a concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. At this point, the volume change rate could not be measured as the agglomerated precipitate did not settle out at all. The turbidity of the supernatant was 100 or more. The results are shown in Table 3.

Comparative Examples 2 and 3

500 ml of the same drainage water as in Example 3 was put into a 500 ml beaker, and a solution of the silica sol-aluminum salt inorganic flocculant having an Si/Al molar ratio of 0.25 (Al: 2.51 g/100 ml) shown in Manufacturing Example 2 was added under agitation at 150 rpm as shown in Table 3. Since pH dropped after addition, it was increased to a neutral range with 1N-NaOH, and the mixture was stirred for 5 minutes. Then, 0.5 ml of Cliflock PA331 having a is concentration of 0.2 mass % was added, stirred at 40 rpm for 5 minutes and left to stand for 10 minutes. The volume change rate of a precipitate after 5 minutes of standing and the turbidity of the supernatant sampled after 10 minutes of standing were measured. The results are shown in Table 3.

TABLE 3

| | Fumed silica-containing drainage water | | | type of inorganic flocculant* | Si/Al or Si/Fe molar ratio |
|---|---|---|---|---|---|
| | Silica concentration(mass %) | silicon concentration (mass %) | pH | | |
| Ex. 1 | 0.58 | — | 6.7 | Si/Al | 0.25 |
| Ex. 2 | 0.25 | — | 6.5 | Si/Al | 0.25 |
| Ex. 3 | 0.25 | 0.29 | 6.7 | Si/Al | 0.25 |
| Ex. 4 | 0.25 | 0.29 | 6.7 | Si/Al | 0.25 |
| Ex. 5 | 0.25 | 0.29 | 6.7 | Si/Al | 0.25 |
| Ex. 6 | 0.25 | 0.29 | 6.7 | Si/Al | 0.05 |
| Ex. 7 | 0.25 | 0.29 | 6.7 | Si/Al | 1.00 |
| Ex. 8 | 0.25 | 0.29 | 6.7 | Si/Al | 3.00 |
| Ex. 9 | 0.25 | 0.29 | 7.2 | Si/Fe | 1.00 |
| Ex. 10 | 0.25 | 0.29 | 7.2 | Si/Fe | 0.25 |
| Ex. 11 | 0.25 | 0.29 | 7.2 | Si/Fe | 3.00 |
| Ex. 12 | 0.25 | 0.29 | 6.2 | Aluminum sulfate | |
| Ex. 13 | 0.25 | 0.29 | 6.7 | Si/Al | 0.25 |
| Ex. 14 | 0.25 | 0.29 | 6.7 | Si/Al | 0.25 |
| C. Ex. 1 | 5.00 | — | 6.2 | Si/Al | 0.25 |
| C. Ex. 2 | 0.25 | 0.29 | 6.7 | Si/Al | 0.25 |
| C. Ex. 3 | 0.25 | 0.29 | 6.7 | Si/Al | 0.25 |

| | metal concentration (mg/L) | pH before addition of organic polymer flocculant | concentration of organic polymer flocculant (mg/L) | volume change rate** (%) | turbidity |
|---|---|---|---|---|---|
| Ex. 1 | 20 | 6.7 | 2 | 27.8 | 1.8 |
| Ex. 2 | 20 | 6.8 | 2 | — | 1.5 |
| Ex. 3 | 20 | 7.1 | 2 | 48.4 | 1.7 |
| Ex. 4 | 50 | 7.2 | 2 | 44.2 | 1.4 |
| Ex. 5 | 100 | 7.1 | 2 | 44.0 | 1.7 |
| Ex. 6 | 20 | 7.3 | 2 | 44.8 | 2.7 |
| Ex. 7 | 20 | 7.1 | 2 | 40.2 | 2.2 |
| Ex. 8 | 20 | 7.2 | 2 | 56.0 | 1.8 |
| Ex. 9 | 20 | 7.4 | 2 | 31.3 | 0.9 |
| Ex. 10 | 20 | 7.2 | 2 | 32.2 | 1.1 |
| Ex. 11 | 20 | 7.8 | 2 | 33.5 | 1.9 |
| Ex. 12 | 20 | 7.4 | 2 | 68.8 | 11.2 |
| Ex. 13 | 20 | 7.6 | 2 | 48.4 | 2.9 |
| Ex. 14 | 20 | 4.2 | 2 | 40.0 | 1.8 |

TABLE 3-continued

| | | | | | |
|---|---|---|---|---|---|
| C. Ex. 1 | 20 | 6.8 | 2 | not settled out | 100 or more |
| C. Ex. 2 | 500 | 7.2 | 2 | 91.8 | 5.2 |
| C. Ex. 3 | 10 | 7.3 | 2 | 44.0 | 21.3 |

Ex: Example
C. Ex.: Comparative Example
*Si/Al means a silica sol-aluminum salt inorganic flocculant and Si/Fe means a silica sol-iron salt inorganic flocculant.
**"—" means that the sedimentation rate is fast and sedimentation ends in 5 minutes.

The invention claimed is:

1. A method of treating drainage water, which drainage water contains fumed silica collected by dispersing fumed silica which will become waste into water from the step of handling powdery fumed silica, to reduce the turbidity of said drainage water, comprising the steps of:

including an inorganic flocculant composed of a silica sol-aluminum salt and having a molar ratio of silicon to aluminum of 0.05 to 1.5 into fumed silica-containing drainage water having a fumed silica concentration of 0.05 to 3.0 mass % or fumed silica-containing drainage water whose fumed silica concentration has been adjusted to 0.05 to 3.0 mass % to ensure that the concentration of the aluminum becomes 15 to 300 mg/L; and adding an organic polymer flocculant, thereby forming an agglomerated precipitate in the drainage water; and separating said agglomerated precipitate from the drainage water in order to reduce the turbidity of the drainage water.

2. The treating method according to claim 1, wherein the fumed silica concentration of the fumed silica-containing drainage water is adjusted to 0.05 to 3.0 mass % by adding silicon powder-containing drainage water.

3. The treating method according to claim 1 or 2, wherein the inorganic flocculant has a pH of 1.5 to 2.5 and an $SiO_2$ concentration of 5 to 25 g/l.

* * * * *